United States Patent [19]
Kriegl

[11] Patent Number: 5,507,947
[45] Date of Patent: Apr. 16, 1996

[54] CENTRIFUGAL APPARATUS FOR SEPARATING PARTICULATE MATERIAL

[76] Inventor: Maximilian Kriegl, Lobmingbergstrasse 35, 8570 Voitsberg, Austria

[21] Appl. No.: 244,442

[22] PCT Filed: Dec. 7, 1992

[86] PCT No.: PCT/AT92/00162

§ 371 Date: Jun. 2, 1994

§ 102(e) Date: Jun. 2, 1994

[87] PCT Pub. No.: WO93/11851

PCT Pub. Date: Jun. 24, 1993

[30] Foreign Application Priority Data

Dec. 5, 1991 [AT] Austria ................ 2423/91

[51] Int. Cl.$^6$ ................ B01D 33/06
[52] U.S. Cl. ........ 210/365; 210/360.1; 210/374; 210/375; 210/402; 210/161; 210/298; 210/398
[58] Field of Search ............ 210/360.1, 365, 210/374, 378, 402, 398, 512.1, 161, 254, 298

[56] References Cited

U.S. PATENT DOCUMENTS 4,451,929  9/1985  Janusch ............... 210/374
5,160,441  11/1992  Lundquist .

FOREIGN PATENT DOCUMENTS 2663240  12/1991  France .
479674  7/1929  Germany .
3834982  4/1990  Germany .
WO90/12919  11/1990  WIPO .

Primary Examiner—Robert A. Dawson
Assistant Examiner—David Reifsnyder
Attorney, Agent, or Firm—Henry M. Feiereisen

[57] ABSTRACT

In an apparatus for separating particulate material from a particle-containing liquid, at least the section of the cylindrical housing (10) provided with perforations (5) is designed as a driveable drum sieve (2') so that the solid materials are optimally separated from the liquid phase and are at the same time freed from particulate impurities.

8 Claims, 1 Drawing Sheet

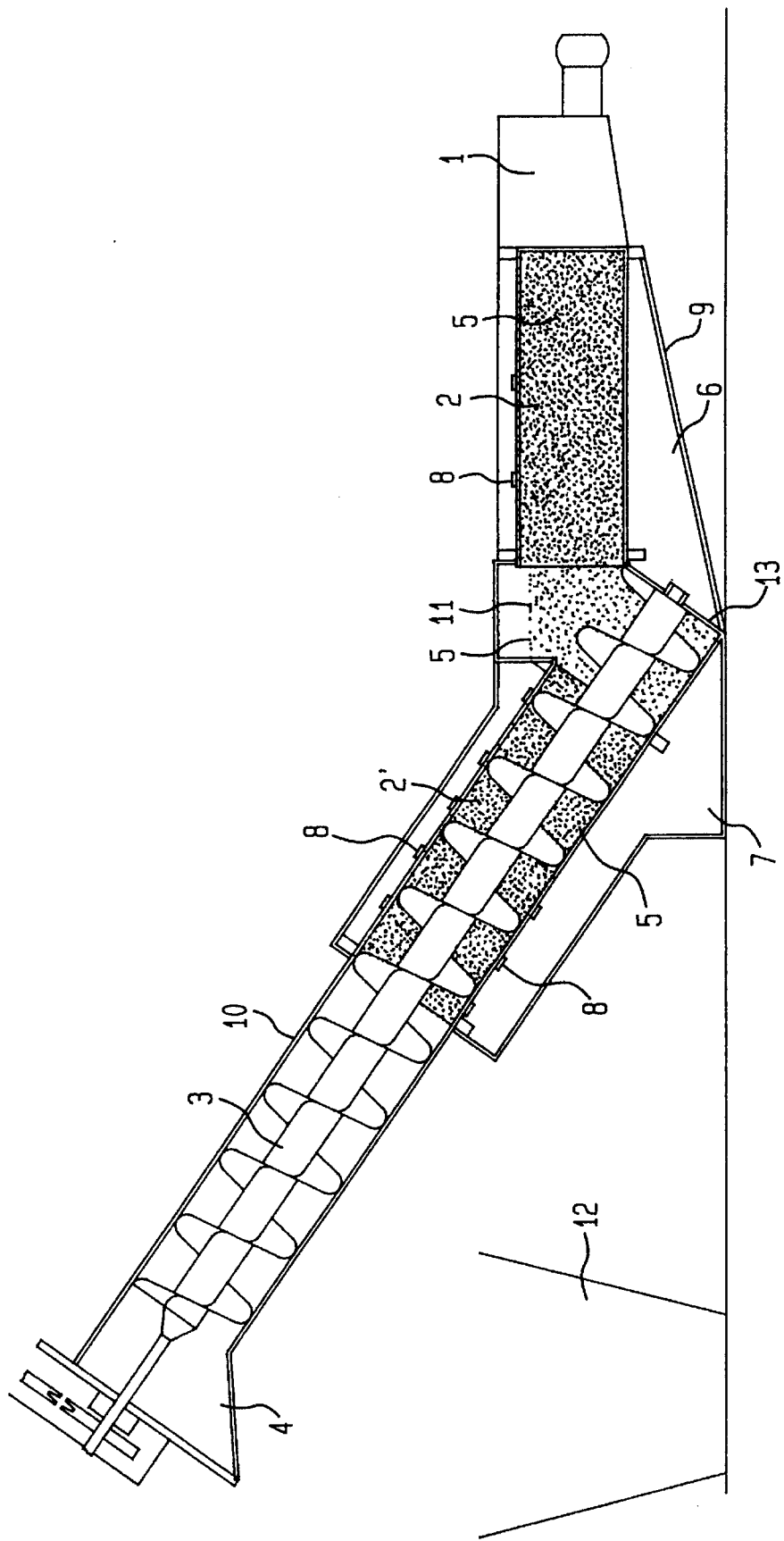

CENTRIFUGAL APPARATUS FOR SEPARATING PARTICULATE MATERIAL

The invention refers to an apparatus for separating particulate material from a particle-containing liquid, including a cylindrical housing which accommodates a driveable screw conveyor and has at least sections thereof provided with perforations.

In known apparatuses of this type, the essential drawbacks reside, on the one hand, in that the separation of the solids from the liquid is effected only in a small part of the housing, thus achieving only an insufficient separation, and moreover due to the low throughput consuming much time for the separation. On the other hand, most of these apparatuses are of complicated structure so that their initial costs are considerable and because of their complexity are increasingly susceptible to disturbances during operation.

It is an object of the invention to obviate these drawbacks and to propose art apparatus of the above-mentioned type which on the one hand ensures a good separation of the solids from the liquid phase and yet is of simple and cost-efficient structure and on the other hand enables a high throughput.

In accordance with the invention, this object is attained by providing at least the perforation-containing section of the cylindrical housing in form of a driveable drum sieve.

The advantageous arrangement of the driveable drum sieve which forms part of the cylindrical housing accomplishes a separation of solid particles contained in the liquid, with the advance of solids being ensured in a simple manner through the screw conveyor. The throughput can be simply controlled by adjusting the rotating speed of the screw conveyor and suited to prevailing requirements.

It may be further suitable to precede the cylindrical housing which has at least sections provided with perforations by an additional cylindrical housing which preferably is provided across the entire surface area with perforations and is also designed in form of a driveable drum sieve.

Thus, advantageously, a first separation of solid materials such as rocks, household waste, industrial waste, rakings and/or screenings and the like from the liquid phase is initially effected across over the entire length of the preceding drum sieve, with fine particles such as sludge particles, fecal particles and the like remaining in the liquid phase. The advance of the solids by this first drum sieve, which is essentially arranged horizontal and slightly inclined in direction of the succeeding cylindrical housing, is advantageously accomplished by the particle-containing liquid which enters the drum sieve via an inlet part, passes therethrough and takes the solids with it. Since the drum sieve is driveable and includes perforations which are spread over the entire surface area, high screening rates are achieved in a simple manner, and a high throughput is equally simply realized at significant separation of the solids from the liquid phase.

Advantageously, a trough with perforations may be provided to connect both housings with each other.

The provision of a perforated trough as connector of both housings has the advantage that the liquid can flow additionally through these perforations to further enable a screening out of solids from the liquid, with the solids collecting on the bottom of the trough where they can be reached by the screw conveyor and carried off.

According to a further feature of the invention, both housings are arranged to each other at an angle, preferably of about 140°.

This measure enables advantageously that the entire particle-containing liquid flowing through the feed inlet is at least once circulated, that is at least once passes either in the housing or in the area of the trough through the perforations so that the solids before being discharged by the liquid are freed from possibly adhering sludge residues, fecal residues or the like, and the particle residues remain in the liquid.

According to a further feature of the invention, spray nozzles may be arranged on the outside of the drum sieves along at least one surface line, preferably however along several surface lines which are offset to each other by about 60°.

Through these measures, on the one hand the perforations of the drum sieves are continuously cleaned and freed from particle residues so as to eliminate in a simple manner a clogging or blocking of the perforations, and on the other hand the entire amount of liquid contained in the apparatus is induced to an additional flowing, promoting a rapid cleaning of the surface of the solids from particles of any kind.

Moreover, it may be suitable to operate the screw conveyor and at least the section of the cylindrical housing forming the drum sieve at preferably different speeds and especially in opposing rotational directions.

Advantageously, through these measures, the solids which are transported by the screw conveyor are repeatedly mixed thoroughly along the conveying path and pressed against the inner housing wall so as to become essentially free from the liquid. The efficiency of the separation of the liquid is further augmented by rotating the housing in a counterdirection to the rotation of the screw conveyor. Then, the liquid exits the housing in the area of the drum sieve of the housing.

It is further advantageous to arrange in the area of the drum sieve spray nozzles which are supplied with water so that apart from cleaning the perforations of the drum sieve, also the solids are subjected to a last cleaning through water entering the interior of the drum sieve by flushing still adhering particles.

The invention will now be described in more detail with reference to the Figure which shows schematically an apparatus according to the invention.

The apparatus has an inlet 1 for solid-laden liquids such as e.g. waste water from industry and household, sewers and the like, with the inlet 1 leading into an inlet box 6 which extends slantingly downwards. Connected to the inlet 1 with one end is a driveable drum sieve 2 which enters with its other end in a trough 11 having perforations 5, with the drum sieve 2 being fully incorporated within the inlet box 6.

Entering the trough 11 opposite to the drum sieve 2 is a cylindrical housing 10 which extends at an angle of preferably about 140° relative to the drum sieve 2. The housing 10 is provided with a section which includes perforations 5 and forms a further drum sieve 2' of the apparatus according to the invention, with this drum sieve 2' also being fully incorporated within the inlet box 6. At least the part of the housing 10 which forms the drum sieve 2' is driveable. However, in accordance with a variation of the apparatus according to the invention, it is also possible to make the entire housing 10 driveable.

Extending in the housing 10 is the screw conveyor 3 which projects also into the area of the trough 11 and is rotatably supported in one bottom area 13 thereof.

By means of the screw conveyor 3, the solids are conveyed to the discharge end 5 out of the trough 11 an thus at the same time out of the inlet box 6 in which the trough 11 is arranged, with the solids being thoroughly mixed initially for several times in the area of the inlet box 6 which is partly filled with incoming liquid, and with particles still adhering to the solids being washed off and mixed in the area of the spray nozzles 8, which extend along one, or as shown in the FIGURE, along several surface lines on the outside of the drum sieve 2', with splash water exiting the spray nozzles 8 and penetrating through the perforations 5 into the drum sieve 2' to free the perforations from pollutants so that the solids are further subjected for a last time to a cleaning to remove still possibly adhering particles.

In order to ensure a repeated thorough mixing of the solids, the screw conveyor 3 and at least the section of housing 10 forming the drum sieve 2', are driven at preferably different speeds and preferably in opposing rotational directions.

Along the section of the housing 10 formed by the closed wall, the solids are pressed against the inner housing wall and against each other during the transport by the screw conveyor 3 as well as by their own weight so that they are essentially dewatered from liquid and splash water.

Thus, solids which are cleaned from particles and substantially dry reach the discharge end 4 and are received e.g. in collecting containers 12 for safe disposal.

Spray nozzles 8 are also provided on the outside of the drum sieve 2 along at least one surface line or, as not shown in the FIGURE, along several surface lines which are spaced from each other by 60° in order to eliminate a clogging or blocking of the perforations 5.

The drum sieve 2 effects a first separation of the solids from the particles, with the separation being accomplished by the inflowing liquid from the spray nozzles 8, the rotation of the drum sieve 2 and the liquid in the inlet box, through thoroughly mixing the solids within the drum sieve 2 repeatedly with the surrounding liquid. The transport of the solids is obtained through the flow prevailing in the inlet container 6 between the inlet part 1 and outlet part 7.

The connection between both drum sieves 2 and 2' is formed by the trough 11, with liquid contained in the inlet box 6 flowing unimpaired through the perforations 5, with solids collecting in the bottom area of the trough 11.

According to a not shown variation of the invention, it is also possible to provide the apparatus according to the invention without the drum sieve 2 or without the drum sieve 2 and without the trough 11. This is especially advantageous when separating particles from a liquid which is only slightly polluted or contains only few solid particles.

The apparatus according to the invention results in a rapid separation of the solid materials from the liquid, with the solids being cleaned from particles and received substantially dry in a collecting container.

I claim:

1. Apparatus for separating particulate material from a particle-containing liquid, comprising:

a first cylindrical housing having an inlet for receiving particle-containing liquid;

a driveable first drum sieve arranged in said housing and extending in elongation of said inlet for passage of the particle-containing liquid longitudinally therethrough;

a second cylindrical housing connected to said first housing;

a second drum sieve arranged within said second housing; and a driveable screw conveyor extending in said second housing and at least partially accommodated in said second drum sieve.

2. Apparatus as defined in claim 1 wherein said first and second drum sieves include perforations across their entire surface area.

3. Apparatus as defined in claim 2, further comprising a trough provided with perforations and connecting said first and second housings to each other.

4. Apparatus as defined in claim 1 wherein said first and second housings are arranged at an angle to each other.

5. Apparatus as defined in claim 4 wherein said first and second housings are arranged to each other at an angle of about 140°.

6. Apparatus as defined in claim 1, further comprising spray nozzles arranged outside of said first and second drum sieves along at least one surface line.

7. Apparatus as defined in claim 6 wherein said spray nozzles are arranged outside of said first and second drum sieves along several surface lines which are offset to each other by about 60°.

8. Apparatus as defined in claim 1 wherein said screw conveyor and said second drum sieve are driven at different speeds and in opposing rotational directions.

\* \* \* \* \*